United States Patent [19]

Barazeche et al.

[11] Patent Number: 4,577,309
[45] Date of Patent: Mar. 18, 1986

[54] METHOD AND APPARATUS FOR MEASURING DISTANT ECHO DELAY IN AN ECHO CANCELLING ARRANGEMENT

[75] Inventors: Bahman Barazeche, Paris; Roger P. J. Alexis, Neuilly sur Seine; Loïc B. Y. Guidoux, Garancieres, all of France

[73] Assignee: 501 Telecommunications Radioelectriques et Telephoniques T.R.T., Paris, France

[21] Appl. No.: 562,612

[22] Filed: Dec. 19, 1983

[30] Foreign Application Priority Data

Dec. 30, 1982 [FR] France ................. 82 22124

[51] Int. Cl.$^4$ .......................... H04J 15/00; H04B 3/20
[52] U.S. Cl. ................... 370/32; 179/170.2; 343/378
[58] Field of Search ............. 179/170.2; 343/378, 343/379; 370/32; 375/77

[56] References Cited

U.S. PATENT DOCUMENTS

| | | | |
|---|---|---|---|
| 3,701,948 | 10/1972 | McAuliffe | 375/77 |
| 4,349,889 | 9/1982 | Van den Elzen et al. | 179/170.2 |
| 4,405,840 | 9/1983 | Zebo | 179/170.2 |
| 4,425,483 | 1/1984 | Lee et al. | 179/170.2 |
| 4,438,530 | 3/1984 | Steinberger | 343/378 |
| 4,464,746 | 8/1984 | Snijders et al. | 370/32 |
| 4,481,385 | 11/1984 | Kalfs | 179/170.2 |

Primary Examiner—Douglas W. Olms
Assistant Examiner—Curtis Kuntz
Attorney, Agent, or Firm—Thomas A. Briody; William J. Streeter; Leroy Eason

[57] ABSTRACT

Method and apparatus for measuring the delay of the distant echo in an echo cancelling arrangement comprising a near echo canceller, a delay line and a distant echo canceller using the steps of transmitting, by modulation of a carrier, a data sequence having a periodic autocorrelation function with sidelobes of negative or zero value, this sequence having a duration at least equal to the maximum value of the delay to be measured and a number of elements determined by the accuracy desired for measurement of the delay;

calculating the correlation function between the data of a next transmitted sequence and the data formed by demodulating the received signal and storing calculated samples of the correlation function in a memory; and determining, among the samples stored, the sample corresponding to the maximum of the correlation function and the rank of that sample.

11 Claims, 6 Drawing Figures

METHOD AND APPARATUS FOR MEASURING DISTANT ECHO DELAY IN AN ECHO CANCELLING ARRANGEMENT

BACKGROUND OF THE INVENTION

1. Field of the Invention

The invention relates to a method of measuring echo delay, used in an echo-cancelling arrangement incorporated in a transceiver arrangement to cancel an echo signal occurring in the receive path in response to a signal supplied to the transmit path and consisting of a substantially undelayed near echo and a delayed distant echo, this echo cancelling arrangement comprising a near echo canceller receiving a signal from the transmit path and a distant echo canceller receiving said signal from the transmit path with a delay substantially equal to the measured distant echo delay.

2. Description of the Prior Art

It is known that echo cancellers are adaptive devices which are incorporated in, for example, data transmission modems connected to a two-way transmission circuit in order to cancel automatically undesirable echoes occurring in the one-way receive path of the modem in response to the signal supplied to the one-way transmit path of the modem. Conventional echo cancellers are generally designed to cancel echo signals which are not delayed or relatively little delayed in relation to the transmitted signal and which may occur during a time interval of 40–50 ms following the instant of originating the transmitted signal. In practice, these characteristics are sufficient to cancel the echoes occurring on all national and international terrestrial circuits.

However, international communications are being conducted more and more via communication satellites. In a circuit of this kind, including a satellite link between two radio-relay stations, it is possible that there will occur in the receive path of a modem a echo which is not or little delayed and is generated in the part of the circuit preceding the satellite link, as well as a distant echo which is generated in the part of the circuit after the satellite link and which is therefore subject to a considerable delay $\tau$, depending particularly on the wave-propagation time in the satellite link. Depending on whether the satellite is geostationary or not and on the variation in the terrestrial link, it can be estimated that in the international switched network the delay $\tau$ of the distant echo may vary between approximately 220 and 630 ms.

To cancel simultaneously the near echo and the distant echo, which each have a relatively short duration of the order of 10 ms or several tens of ms but which are separated by a large time interval of the order of the delay $\tau$, it is an advantage to use the configuration described above and known from the article by Stephen B. Weinstein, entitled "A Passband Data Driven Echo Canceller for Full-Duplex Transmission on Two-Wire Circuits" and published in the journal IEEE Transactions, Vol. COM-25, No. 7, July 1977, pp. 654–666. This configuration comprises a section for cancelling the near echo, a delay line simulating the delay $\tau$ and connected thereto a section for cancelling the distant echo. This configuration makes it possible to use two conventional echo cancellers of reasonable complexity, but necessitates measurement of the delay $\tau$ of the distant echo in order to introduce this information into the delay line. In the above-mentioned article it is proposed, in order to measure this delay, to apply to the transmit path a pulse formed by a 1000 Hz sinusoidal signal lasting several ms and to determine the resulting distant echo delay with a moving-window power detector. With this method, the signal used to measure the echo delay is therefore only transmitted for a short time, which is a disadvantage in satellite communications for which the transmission of energy has to be permanent in a communication path in order to maintain that path.

SUMMARY OF THE INVENTION

For measurement of the delay $\tau$ of the distant echo, the present invention provides an entirely different method in which, in order to generate the echo, use is made of a particular data sequence which can be transmitted with the same type of modulation as that subsequently used to transmit the useful signal; at the receiving end this method can be easily implemented digitally and yields the delay with a perfectly defined precision which can be reduced to the right value desired.

According to the invention, this method of measuring the delay $\tau$ of the distant echo comprises the following steps:

transmission, by modulation of a carrier, of successive data sequence each having a periodic autocorrelation function with sidelobes of negative or zero value, and having a duration at least equal to the maximum value of the delay to be measured and a number of data elements determined by the precision desired for measurement of the delay;

after each transmitted data sequence, calculation of the correlation function between the data of the next transmitted sequence and the data recovered by demodulating the received echo signal resulting from the preceding sequence and storing successive samples representative of said correlation function in a memory;

after calculation of said correlation function, processing of the stored samples consisting, after elimination of samples which may depend on the near echo, in determining the sample corresponding to the maximum value of said correlation function and calculating the delay of the distant echo from the rank of such sample among all samples of the correlation function.

Features of the invention will be more fully appreciated from the following description of an exemplary embodiment when considered in conjunction with the accompanying.

DESCRIPTION OF THE PREFERRED EMBODIMENTS

Figure 1:
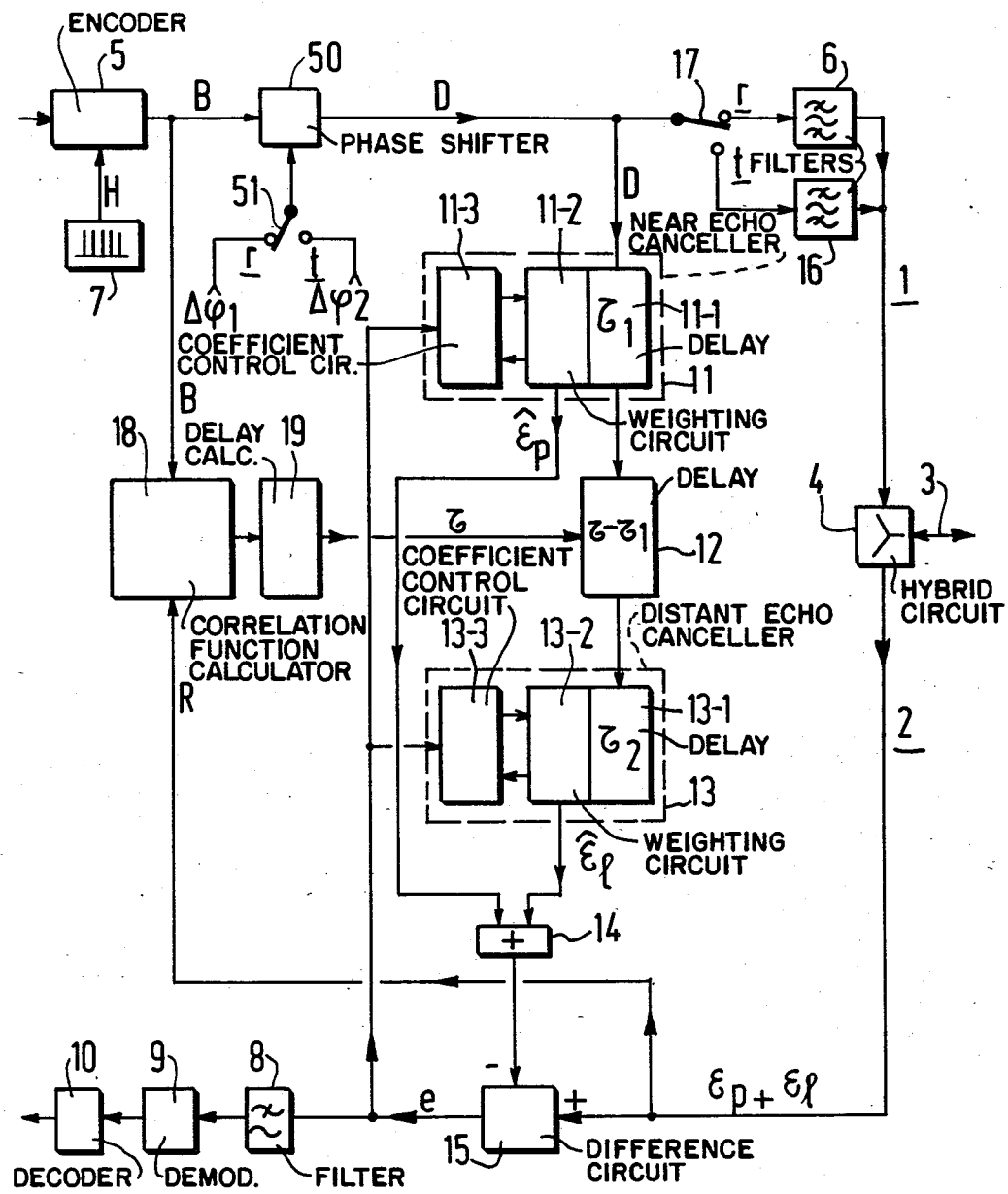
FIG. 1 shows a data transceiver or modem which includes an echo cancelling circuit to which the method according to the invention may be applied.

The modem provided with an echo-cancelling arrangement as shown in FIG. 1 comprises a transmit path 1 and a receive path 2 coupled to a two-way transmission path 3 via a (hybrid) coupling circuit 4.

The transmit path 1 comprises an encoder 5 which converts the binary data to be transmitted, originating from a terminal which is not shown, into a baseband signal B which is generally complex and whose phase and amplitude may change in value, as a function of the binary data to be transmitted, at a clock frequency H supplied by a clock generator 7. The complex signal B is applied to a circuit 50 in which its phase is incremented at each period $1/H$ by the phase variation (during this period $1/H$) of the carrier used for transmitting. During the transmission of useful data this phase variation of value $\Delta\rho_1$ is applied to circuit 50 via a switch 51 set to position r. The complex signal D supplied by circuit 50 and thus subjected to the phase variations of the carrier is applied, during the transmission of useful data, to a band-pass filter 6 for complex signals via a switch 17 also set to position r. The passband of filter 6 is centered on the frequency of the carrier used for the transmission of useful data and this filter 6 thus supplies the analog modulated carrier signal which is applied to the transmit access of hybrid coupling circuit 4. The modulation rate of the carrier is determined by the clock frequency H. In the case of, for example, a standardized modem using eight-phase modulation, the modulation rate is 1600 Baud and the frequency of the carrier is 1800 Hz.

At the receive access of hybrid coupling circuit 4 there should only appear a carrier signal received from transmission path 3 and modulated with data originating from a remote modem (not shown). This receive access is connected via a low-pass filter 8 to a demodulator 9 which recovers the baseband data signal generated in the transmitter of the remote modem. Demodulator 9 is connected to a decoder 10 which effects the inverse operation of that effected in the remote modem by an encoder corresponding to encoder 5, thereby restoring the data bits of the baseband signal, and provides them to a terminal which is not shown.

In fact, when a useful signal is transmitted towards a remote modem (not shown) via transmit path 1, undesirable echo signal, caused particularly by imperfections in the two-wire/four-wire coupling circuits of the transmission path 3, may appear at the receive access of the coupling circuit 4 and interfere seriously with the restoration of the data in receive path 2. As has been explained, when the transmission path 3 includes a satellite link, the undesired echo signal may simultaneously incorporate a non-delayed near echo generated between the local modem and the satellite link and a distant echo generated between the satellite link and the remote modem. These two types of echo are of substantially the same length, with a maximum of several tens of ms; but the distant echo has, in relation to the near echo, a delay $\tau$ which may vary, for example, between 220 and 630 ms.

To effect economically the cancellation of an echo signal formed by a near echo and a distant echo it is possible to use the configuration shown in FIG. 1. This configuration includes a near echo canceller 11, comprising in particular a memory 11-1 having the function of a delay line, a memory 12 having the function of a delay line, and a distant echo canceller 13, comprising in particular a memory 13-1 having the function of a delay line. The three delay lines 11-1, 12 and 13-1 are connected in cascade and they receive the transmitted data signal subjected to the phase variations of the carrier by circuit 50. It may be assumed for the sake of simplification that the sampling frequency of signal D applied to configuration 11, 12 and 13 is equal to the clock frequency H fixing the modulation rate. In fact, in the event that the sample frequency is a multiple of frequency H, it is known that the signal D may be considered as being distributed in time over several identical configurations each operating in the same manner with the sample frequency H.

The near echo canceller 11 comprises a calculation circuit 11-2 which forms the weighted sum of the samples of signal D, stored in the delay line 11-1, with weighting coeffcients determined in a control circuit 11-3. Delay line 11-1 produces a delay $\tau_1$ which is substantially equal to the duaration of the near echo. Delay line 12 produces a delay which is substantially equal to $\tau - \tau_1$ so that the samples of signal D arrive at the input of the delay line 13-1 with a delay which is substantially equal to the delay $\tau$ of the distant echo. The distant echo canceller 13 comprises a calculation circuit 13-2 which forms the weighted sum of the delayed samples of signal D, stored in delay line 13-1, with weighting coefficients determined in a control circuit 13-3. Delay line 13-1 produces a delay $\tau_2$ which is substantially equal to the maximum duration of the distant echo and which is of the same order of magnitude as $\tau_1$.

Memories 11-1, 11-2 and 13-1, 13-2 serve as transversal filters whose echo correcting output signals $\hat{\epsilon}_p$ (for the near echo) and $\hat{\epsilon}_p$ (for the distant echo) are applied to an adder 14. The signal $\hat{\epsilon}_p + \hat{\epsilon}_p$ leaving adder 14 is applied to the $(-)$ input of a difference circuit 15. This difference circuit 15 is inserted via its input $(+)$ and its output in receive path 2, between hybrid coupling circuit 4 and filter 8. The output signal e of difference circuit 15 is also applied to the two control circuits 11-3 and 13-3 in order to adjust the coefficients of the transversal filters of the near echo canceller 11 and the distant echo canceller 13. When these coefficients are suitably adjusted, the correcting signal $\hat{\epsilon}_p$ supplied by the filter of near echo canceller 11 is practically equal to the near echo signal $\epsilon_p$ which appears on the receive path 2 and the correcting signal $\hat{\epsilon}_p$ supplied by the filter of distant echo canceller 13 is practically equal to the distant echo signal $\epsilon_p$ which likewise appears on the receive path 2. The effect of this is that, in the output signal e of difference circuit 15, the received signal $\epsilon_p + \epsilon_p$ resulting from the near and distant echoes is practically cancelled. The adjustment of the filter coefficients of echo cancellers 11 and 13 may be effected, for instance by successive iterations in accordance with a gradient algorithm, so as to minimize the mean square value of the difference signal e.

However, for this known configuration to operate correctly in this fashion, it is necessary for the distant echo canceller 13 to act on a transmitted signal D which has undergone the same delay $\tau$ as the received distant echo. The present invention provides a simple and efficient method for measuring this delay, which varies with the path for the distant echo.

Figure 2:
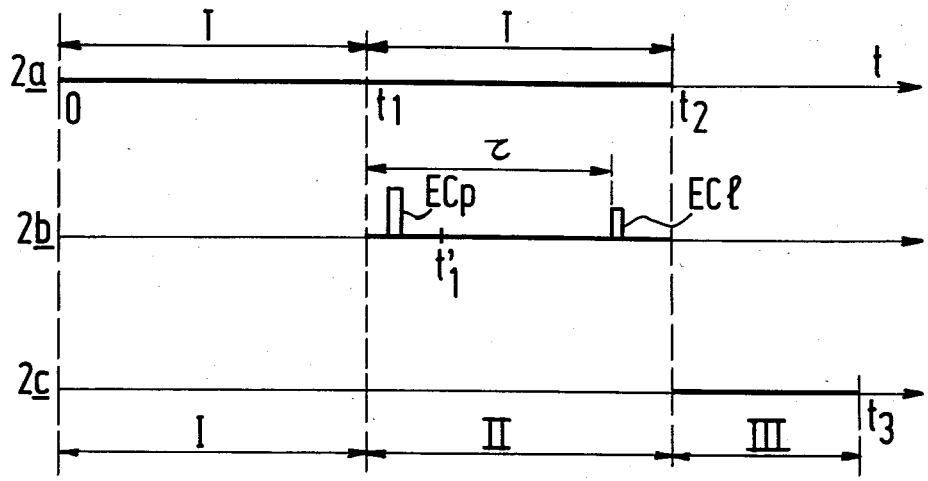
FIG. 2 shows diagrams illustrating the time sequence of the steps of the method according to the invention.

This method comprises steps which occur in a time sequence in accordance with the diagrams in FIG. 2. Diagram 2a refers to the operations carried out in transmit path 1 using steps I and II; diagram 2b refers to operations carried out on the basis of signal D in transmit path 1 and signal R in receive path 2 during step II; diagram 2c refers to processing effected during step III.

Step I, which extends from instant t=0 to instant $t_1$ (see diagram 2a), consists in transmitting via transmit path 1, by modulation of a carrier, a data sequence with a duration T having a periodic autocorrelation function with sidelobes whose value is negative or zero. For the transmission of this sequence the same carrier can be used as that used in the useful-data transmission mode, the switches 51 and 17 then occupying position r. However, as will be explained below, it may be an advantage in the transmission of this sequence to use another carrier with a different frequency. In that case the switches 51 and 17 are set to position t. In this way, the phase of the baseband signal B is incremented in circuit 50 by the phase variation $\Delta\rho_2$ of this other carrier during a period 1/H, while the signal D thus obtained is applied to band-pass filter 16 for complex signals whose passband is centred on the frequency of this other carrier. The duration T of the transmitted data sequence is at least equal to the maximum value of the delay $\tau$ to be measured. The number of elements in this sequence is determined by the precision desired for the measurement of the delay. As will be explained clearly below, the precision of the measurement of the delay is determined by the duration of each element in the sequence.

Step II is performed in a circuit 18 of FIG. 1 which receives the baseband signal B provided by encoder 5 and the signal R received in receive path 2. During this step II a succeeding data sequence identical to the prior data sequence transmitted during step I is transmitted in the same manner from instant $t_1$ to instant $t_2$ (see diagram 2a). At the same time, during the duration T of this succeeding transmitted sequence (see diagram 2b), the correlation function between the baseband data in the succeeding transmitted sequence and the received data formed by demodulating the echo signal received in receive path 2 from the transmitted prior data sequence is calculated. Successive samples of this correlation function are stored in a memory. As shown schematically in diagram 2b, there may be found among such stored samples two particular samples with a greater amplitude than the others, namely a sample $EC_p$ due to the near echo and near instant $t_1$ and a sample $EC_p$ due to the distant echo and occurring at an instant which is shifted by the delay $\tau$ to be measured in relation to instant $t_1$.

Step III may be performed by a circuit such as 19 of FIG. 1 immediately after step II, from instant $t_2$ to instant $t_3$ (see diagram 2c). It consists in a processing of the successive samples of the correlation function stored in the memory during step II, in order to determine, after elimination of samples which may depend on the near echo, the sample corresponding to the maximum of the correlation function; the rank of this sample, i.e. in practical terms its location in the memory, then provides information characterizing the delay $\tau$ of the distant echo. It will be readily appreciated that the precision of measurement of the delay $\tau$ depends on the duration of each correlation-function element, i.e. in fact on the duration of each element in the transmitted sequence.

The information characterizing the delay $\tau$ is used in delay line 12 of the echo cancelling arrangement to delay accordingly the data signal D applied to the distant echo canceller 13. To define the length of delay line 13-1 of this echo canceller the precision of measurement of the delay $\tau$ has to be taken into account.

It will now be shown how the various steps of the method according to the invention can be performed. To help clarify the picture, it will be assumed by way of example that in the modem associated with the echo cancelling arrangement the useful data are normally transmitted using eight-phase modulation, with an 1800 Hz carrier and a modulation rate of 1600 Baud.

For the sequence to be transmitted during steps I and II a first possibility consists in using sequences known as maximum-length sequences. The possible lengths in terms of binary elements are $N=2^N-1$, n being an integer. These sequences consisting of $+1$ and $-1$ bits have a periodic autocorrelation function whose main lobe has the value N and all the sidelobes have the value $-1$. With a binary sequence of this kind applied to encoder 5, the baseband signal b is real and has a phase of 0° or 180° according as the bits in the sequence are of the value $+1$ or $-1$. If use is made of the 1800 Hz carrier for the useful-data transmission mode, switches 51 and 17 will be set to position r so that the data signal D delivered by circuit 50 will be subject to the phase variation $\Delta\tau_1$ of the carrier during the modulation period of 1/1600 s and this signal D will be applied to filter 6. However, as will be seen below, it is more advantageous to use a carrier frequency which is equal to the modulation rate, namely 1600 Hz. In that case switches 51 and 17 are set to position t. For this carrier frequency the phase variation $\Delta\rho_2$ to be used in circuit 50 is 360° and its action on the baseband signal B may be omitted; the data signal D is applied to filter 16.

Another possibility with regard to the sequence to be transmitted consists in using multiphase data sequences whose periodic autocorrelation function has sidelobes which are all zero. These sequences are referred to in, for example, U.S. Pat. No. 3,099,796 and in an article by D.C. CHU entitled "Polyphase code with good periodic correlation properties", published in the journal IEEE Transactions on Information Theory for July 1972. A sequence of this kind is formed by complex data and constitutes the baseband signal B which, as has been explained, is applied to circuit 50 to be subjected to the phase variation of the carrier during a modulation period. It has been possible to verify, for example that with eight-phase modulation, sequences with a length $N=64$ having a periodic autocorrelation function with zero sidelobes can be obtained; with four- or two-phase modulation, sequences of this kind with lengths $N=16$ or 4 can be obtained.

The total duration T of the sequences to be transmitted (of either of the two types given above) must be at least equal to the maximum value of the delay $\tau$ of the distant echo, e.g. 630 ms. In measuring this delay $\tau$ it may be possible to make do with an accuracy of e.g. $+5$ ms, which means that each element in a sequence (of either type) must have a duration of 10 ms. It will, for example, be possible to use a maximum-length sequence of 63 elements or a multiphase sequence of 64 elements. These elements will then have to be transmitted at a rate of 100 Hz, i.e. a rate which is 16 times lower than the normal rate of 1600 Hz. For this transmission at a rate of 100 Hz of the elements in sequences used to measure the delay $\tau$, it is an advantage, in order to use the same circuits in the transmit path as in normal operation, to have the transmit path operate at the normal rate of 1600 Hz, repeating the same value for each element in these sequences 16 times.

Figure 3:
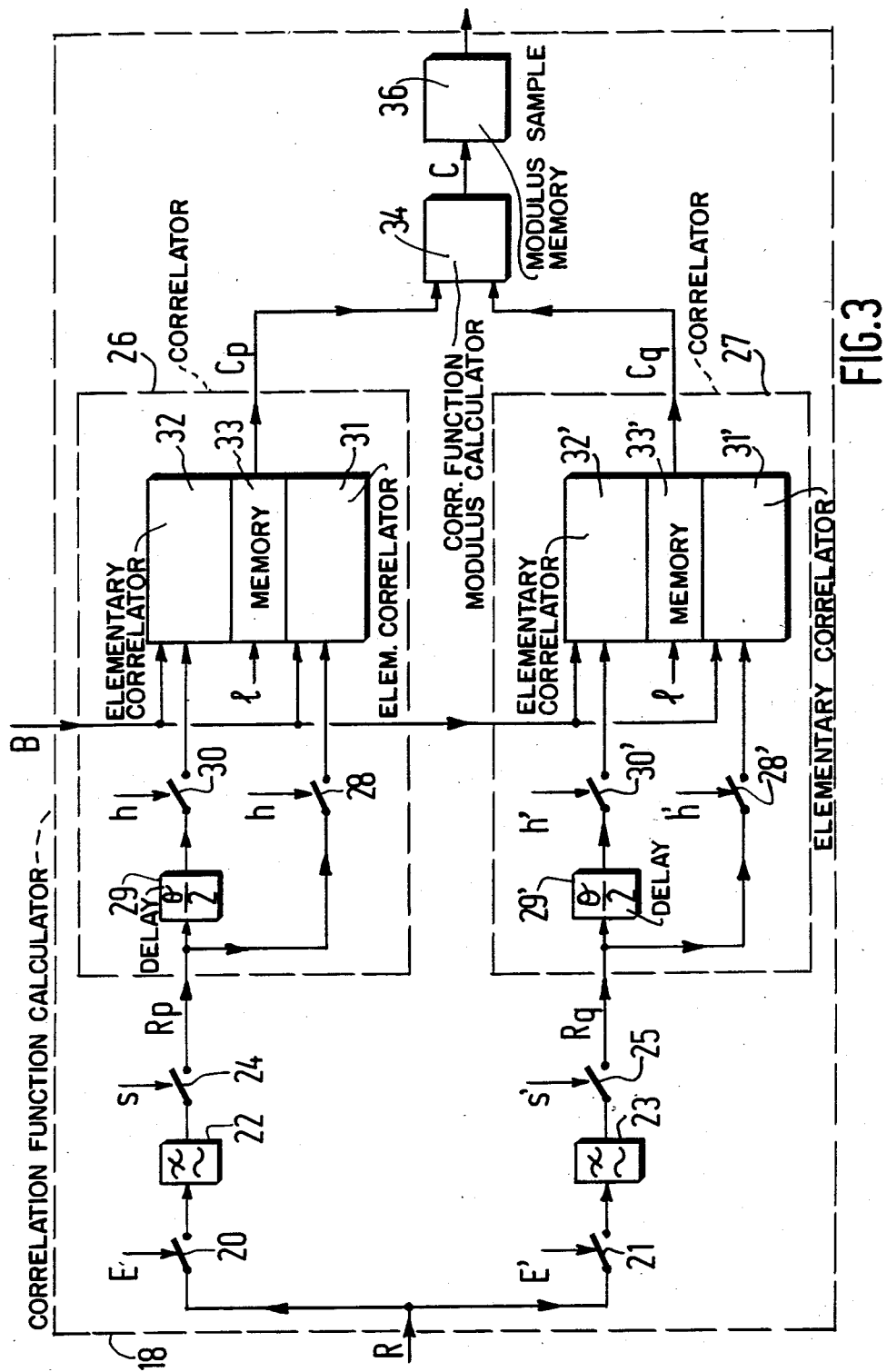
FIG. 3 is a diagram of correlation function calculating circuit 18 in FIG. 1 for implementing the second step of the method according to the invention.

Circuit 18 which performs step II of the method according to the invention may be embodied in accordance with the diagram of FIG. 3. Circuit 18 receives the signal R appearing at the receive access of coupling circuit 4 on the one hand and on the other the baseband signal B of the transmit path which, during step II, is constituted by a sequence of one of the types described above.

It is first necessary to demodulate the received signal R. Non coherent demodulation can be effected with the aid of the in-phase transmission carrier and the quadrature-phase transmission carrier. In the case that the transmission carrier used for transmission of the delay-measurement sequence has a frequency equal to the modulation rate (H=1600 Hz in the example chosen), the demodulation of signal R can be effected in a particularly simple manner as shown in FIG. 3. The received signal R is applied to two sampling circuits 20 and 21, one of which, 20, is operated by a sampling signal E having the same frequency (1600 Hz) and phase as the transmission carrier and the other of which, 21, is operated by a sampling signal E' having the same frequency as E, with a phase shift of 90° corresponding to a time shift of $1/(4.1600)$ s. The sampling effected in circuits 20 and 21 at the frequency of the carrier comes down to carrying out a demodulation operation. Connected to the outputs of sampling circuits 20 and 21 are low-pass filters 22 and 23, intended to eliminate components with frequencies higher than the fundamental frequency of the spectrum of the transmitted data sequence (1600 Hz in the sample chosen). At the output of the two filters 22 and 23 there are thus obtained, with a sample rate equal to the modulation rate H=1600 Hz, the in-phase and quadrature-phase components of the received signal transferred to the baseband. These components are applied to sampling circuits 24 and 25 which are operated by two sampling signals S and S' having a same frequency and being shifted in relation to each other, as are the sampling signals E and E'. The sampling frequency determined by the sampling signals S and S' should be at least twice the rate of the data in the transmitted sequence. In the example chosen, in which this data rate is 100 Hz, a sampling frequency of 200 Hz may be used.

At the output of the two sampling circuits 24 and 25 there are thus obtained the two in-phase and quadrature-phase components $R_p$ and $R_q$, together forming a complex signal sampled with a frequency of 200 Hz. It is now necessary to calculate the correlation function between this complex signal and the baseband signal B of the transmit path, constituted by a maximum-length sequence or a multiphase data sequence. In the latter case, signal B is composed of complex data and calculation of the correlation function involves multiplications of complex terms whose real and imaginary parts are different from zero. In the case of a maximum-length sequence, signal B comprises real data with values of +1 and −1 and calculation of the correlation function only involves multiplications of real terms. For simplicity's sake, only the case in which a maximum-length sequence is used will be considered in the rest of the description of FIG. 3. Signals $R_p$ and $R_q$ are then applied to two correlators 26 and 27 which have the same configuration and which each receive the baseband signal B. For the reasons explained above the practical case will be considered in which this signal is a data sequence formed of 63 elements each having a duration of 10 ms.

In correlator 26, samples of signal $R_p$ at 200 Hz are applied directly to a sampling circuit 28 and via a delay circuit 29 to a sampling circuit 30. The delay circuit 29 produces a delay equal to (1/200) s; the two sampling circuits 28 and 30 are operated by a sampling signal h with a frequency of 100 Hz which is synchronous with the sampling signal s so that these sampling circuits 28 and 30 respectively supply the even samples $R_p(p)$ and odd samples $R_p(i)$ of the signal $R_p$ at a rate of 100 Hz. These even and odd samples are respectively applied to elementary correlators 31 and 32. The latter also receive the baseband signal B and use a memory 33 in common. The configuration of elementary correlators 31 and 32 will be described below with the aid of FIG. 4. As will emerge from that description, during step II extending from instant $t_1$ to instant $t_2$, elementary correlator 31 forms 63 even samples of the correlation function between the baseband signal B and the even samples of signal $R_p$. During this step II, elementary correlator 32 forms 63 odd samples of the correlation function between the baseband signal B and the odd samples of signal $R_p$. The 63 even samples formed in correlator 31 are available at instant $t_2$ at even addresses in memory 33 and the 63 odd samples formed by correlator 32 are available at instant $t_2$ at odd addresses in memory 33. Under the control of a read-out signal $\rho$ for memory 33, the 126 samples stored in memory 33 can be made to appear in series at the output of this memory, the even and odd samples being interlaced. These 126 samples represent the in-phase component $C_p$ of the wanted correlation function, with a sample rate of 200 Hz.

The correlator 27 which processes signal $R_q$ is formed of elements 29' to 33' which are identical to elements 29 to 33 of correlator 26 and connected in the same fashion. Sampling circuits 28' and 30' are operated by a sampling h' which is synchronous with sampling signal s'. The operation of correlator 27 is identical to that of correlator 26 and under the control of a read-out signal $\rho$ there can appear in series, at the output of memory 33', 126 samples which are representative of the quadrature-phase component $C_q$ of the wanted correlation function, with a sample rate of 200 Hz.

Memories 33 and 33' in which the samples of components $C_p$ and $C_q$ are formed during step II are read out, preferably at a high speed, by the same read-out signal at the end of this step II. The corresponding samples are applied simultaneously to a calculation circuit 34 which calculates the modulus C of the correlation function, i.e. the quantity $\sqrt{C_p^2 + C_q^2}$. It is generally possible to make do with approximate values of this quantity, calculated with the aid of well-known methods. The 126 successive samples of the modulus C of the correlation function formed at the sample rate of 200 Hz, are stored in locations of a memory 36 in order to be used in step III of the method according to the invention. Given that the read-out of samples in memories 33 and 33' and the calculation of the 126 samples of modulus C in circuit 33 can be performed very quickly, it will be assumed henceforth that this step III begins practically at instant $t_2$.

Figure 4:
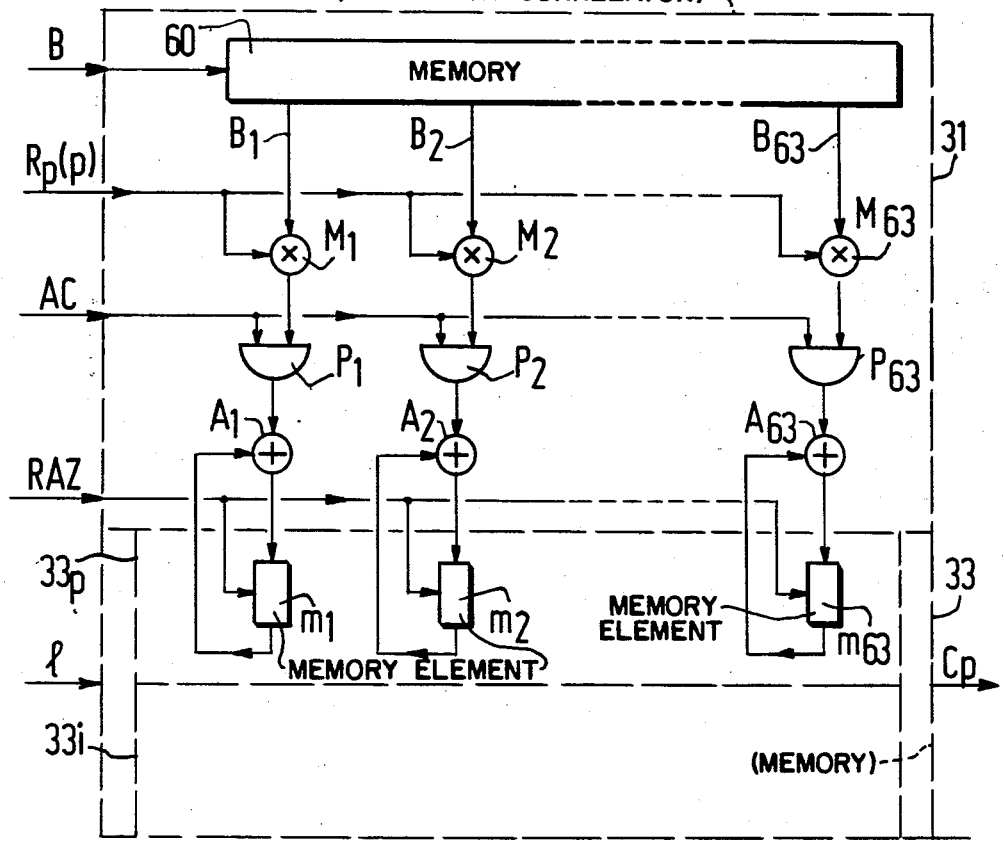
FIG. 4 is a diagram of the elementary correlator circuit 31 in the correlating function calculating circuit shown in FIG. 3.

Elementary correlators 31, 32, 31' and 32' are identical and can be designed, for example, in accordance with the diagram of FIG. 4. In this FIG. 4, elementary correlator 31 is shown as using part $33_p$ of memory 33. This elementary correlator 31 uses a 63-element memory 60, which may be common to the other elementary correlators. In this memory 60 are written the successive elements of the baseband signal B which appear at a rate of 100 Hz. Memory 60 is arranged so as to supply at its 63 outputs $B_1$–$B_{63}$ the last 63 written-in elements of signal B. The elements of signal B appearing at these outputs $B_1$ to $B_{63}$ are applied to an input of multipliers $M_1$ to $M_{63}$. At another input, all of these multipliers receive a same signal constituted by the even samples of the signal $R_p$, i.e. $R_p(p)$. The products formed at the outputs of multipliers $M_1$ to $M_{63}$ are led to an input of adders $A_1$ to $A_{63}$ via gates $P_1$ to $P_{63}$. These gates are controlled by a signal AC and are only conductive for the duration of step II extending from instant $t_1$ to instant $t_2$. Adders $A_1$ to $A_{63}$ are connected to memory elements $m_1$ to $m_{63}$ so as to form 63 accumulators in which the products formed at the output of multipliers $M_1$ to $M_{63}$ during the period extending from instant $t_1$ to instant $t_2$ are accumulated. The memory elements $m_1$ to $m_{63}$ are reset to zero by a reset pulse RAZ occurring at instant $t_1$. Thus, starting from instant $t_2$, there are available in the memory elements $m_1$ to $m_{63}$ the 63 even samples of the correlation function between signal B and the even samples of signal $R_p$. These elements $m_1$ to $m_{63}$ together form part $33_p$ of memory 33, which is associated with elementary correlator 31. In part $33_i$ of memory 33 it is possible to form in the same manner, with the aid of elementary correlator 32 (not shown in FIG. 4), the 63 odd samples of the correlation function between signal B and the odd samples of signal $R_p$. As already explained, these even and odd samples available at instant $t_2$ in memory 33 can be made to appear in series and interlaced at the output of memory 33 by means of the read-out signal $p$ in order to form samples at a rate of 200 Hz of the inphase component $C_p$ of the wanted correlation function.

Step III of the method according to the invention performed in circuit 19 is a processing of the samples stored in memory 36 in order to deduce from them the delay $\tau$ of the distant echo.

In the case that a multiphase data sequence has been used as the transmission side, this processing operation can be particularly simple; in fact, the character of the periodic autocorrelation function for this type of sequence implies that all the samples stored in the memory have, apart from the noise, a value zero, excepting those generated by the near and distant echoes. Processing during step III (from instant $t_2$ to instant $t_3$) may then consist of the following operations:

read-out from memory 36 of the samples C which are calculated in step II from instant $t'_1$ to instant $t_2$ (see FIG. 2b), $t'_1$ being the instant up to which, at the most, the samples C generated by the near echo can extend;

determining among the samples C read out, which therefore include only the contribution of the distant echo, the sample with maximum value which is generated by the distant echo;

determining the delay time $\tau$ of the distant echo as a function of the rank of the sample with maximum value.

Figure 5:
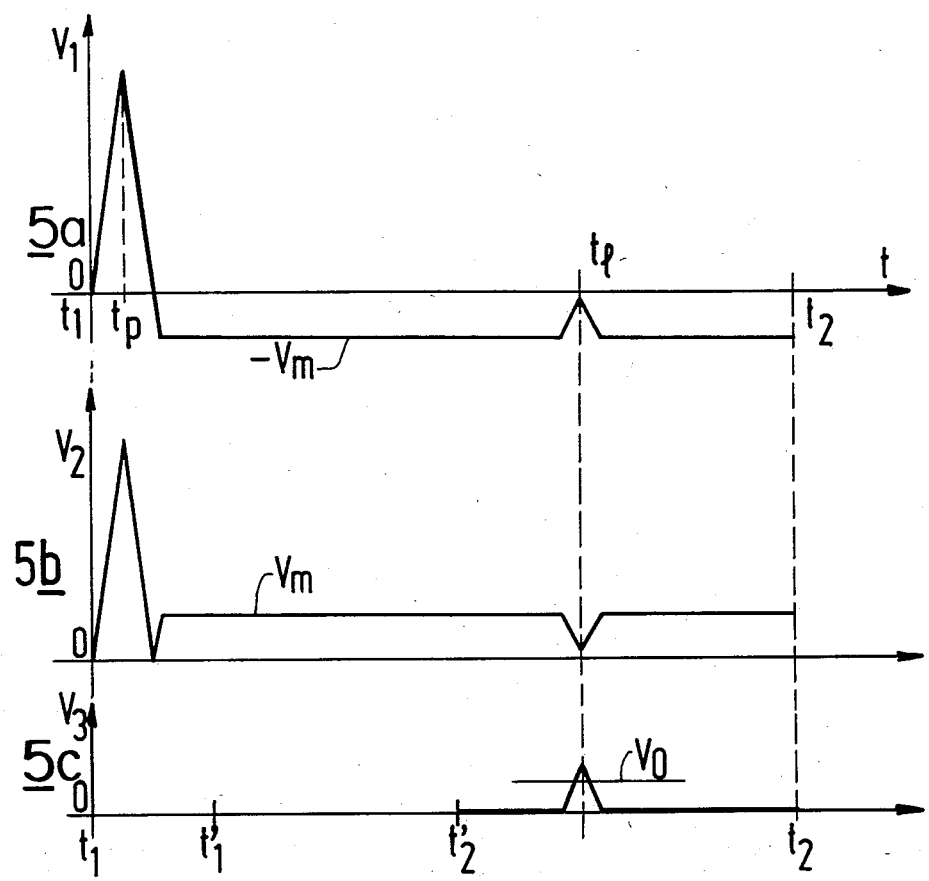
FIG. 5 shows time-sequence diagrams which illustrate the processing effected during the delay calculating step of the method of the invention.

In the case that a maximum-length pseudo-random sequence length has been used at the transmission side, the processing of sample C is slightly more complicated by the fact that the periodic autocorrelation function of this type of sequence has side-lobes which are not zero. The problem which this case presents and the means of resolving it are explained with the aid of time diagrams in FIG. 5.

Diagram 5a shows schematically signal $V_1$ representing the correlation function which would be obtained during the time interval $(t_1, t_2)$ of step II if the received signal R were demodulated with a recovered carrier having the phase of the received carrier. The curve representing $V_1$ shows at instant $t_p$ a peak due to the near echo and at instant t a peak due to the distant echo, these two peaks rising above a continuous negative level with a value of $-V_m$, due to the fact that a maximum-length sequence whose sidelobes are negative has been used at the transmission side. The level of the near echo is very large in relation to that of the distant echo (with a ratio of 40 dB, for example), so that the continuous level $-V_m$ depends mainly on the level of the near echo which may vary. Diagram 5b shows the signal $V_2$ representing the modulus C of the correlation funtion calculated, as has been explained with the aid of FIG. 3, by effecting demodulation with the aid of the in-phase and quadrature-phase transmission carrier. The values of signal $V_2$ are obtained by taking the absolute value of the values of signal $V_1$. The peaks in signal $V_2$ due to the near echo and to the distant echo are on either side of the positive continuous level $V_m$. To eliminate the harmful effect of unavoidable variations of the continuous level $V_m$ while determining the peak produced by the distant echo, it is possible to effect in circuit 19 a preliminary processing of the samples read from memory 36, so that there will only appear in this read-out signal, after the processing, the peak due to the distant echo rising beyond the zero level; the ideal signal $V_3$ to be obtained after this preliminary processing is shown in diagram 5c, the time scale along the abscissa representing the real times for calculation of the correlation.

Figure 6:
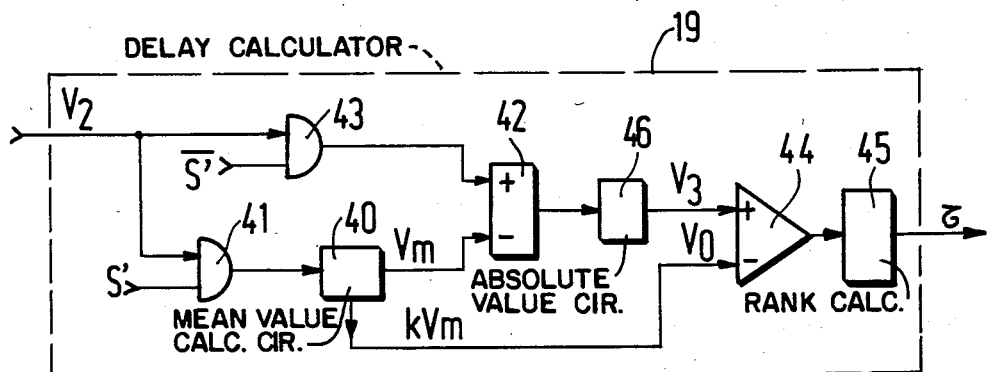
FIG. 6 is a diagram of a circuit for calculating the echo signal delay from a correlation function modulus sample signal $V_2$ as shown in FIG. 5($b$).

FIG. 6 shows a possible diagram of circuit 19, which receives the samples read from memory 36 of circuit 18 and in which this preliminary processing is effected. It is assumed that these read-out samples arriving at the input of circuit 19 have been calculated after instant $t'_1$ in the course of step II and do therefore not include the peak due to the near echo. The signal read out under these conditions which, in real time, is the signal $V_2$ shown in diagram 5b from instant $t'_1$ onwards, is applied to a circuit 40 via a gate 41 which transmits this signal $V_2$ thanks to a suitable control signal S' during a time interval corresponding in real time to the interval $(t'_1, t'_2)$ in which no near or distant echo occurs; $t'_1$ and $t'_2$ are, for example, 50 ms and 200 ms from instant $t_1$. Circuit 40 forms the mean value of the samples which have been applied to it and thus provides the continuous level $V_m$ which is applied to and maintained at the $(-)$ input of a difference circuit 42 until the end of processing, extending in real time to instant $t_2$. The read-out signal $V_2$ is also applied to the $(+)$ input of difference circuit 42 via a gate 43 controlled by the signal $\overline{S'}$ which is the complementary of S'. In this way the read-out signal $V_2$ is applied to the $(+)$ input of difference circuit 42 as from instant $t'_2$. The signal supplied by this difference circuit is applied to a circuit 46 which takes its absolute value, so that the signal supplied by this circuit 46 becomes identical to the signal $V_3$ shown in real time in diagram 5c. The samples of signal $V_3$ are compared with a threshold $V_o$ with the aid of a comparator circuit 44. The information that a sample has exceeded the threshold is passed on to a circuit 45, in which the rank of this sample, which corresponds to the delay $\tau$ of the distant echo, is determined. It may be an advantage for the threshold $V_o$ not to be fixed but to depend on the continuous level $V_m$ measured, in accordance with the law $V_o = k V_m$, k being a proportionality coefficient to be controlled. There is thus a variable threshold which adapts to the noise level in the transmission medium and thereby gives a fixed error probability, whereas with a fixed threshold the error probability would depend on the transmission level. It should be noted that all the samples of signal $V_3$ are compared with the threshold $V_o$ and each time that the threshold is exceeded, circuit 45 compares the amplitude of this new excess with the preceding excess and if its amplitude is greater, circuit 45 memorizes the amplitude of the new excess and its rank is determined. Otherwise, the preceding excess is retained.

It may be noted that circuit 19 as shown in FIG. 6 is also suitable when a multiphase data sequence is used at the transmission side. Thanks to the use of a threshold, it makes it possible to eliminate completely the influence of noise in the determination of the sample generated by the distant echo.

The method according to the invention and the corresponding apparatus have been described above for the case when a first sequence of data is transmitted, followed by a second sequence in the course of which correlation function samples are calculated which are processed in step III. However, in order to improve the signal-to-noise ratio during this processing, it is also possible to transmit after the first sequence a certain number of other sequences in the course of each of which correlation-function samples are calculated, the corresponding samples calculated in the course of these other sequences being integrated before being processed in step III in the manner explained.

What is claimed is:

1. A method of measuring delay of a distant echo signal, for use in adapting an echo cancelling circuit incorporated in a transceiver to cancel an echo signal occurring in the receive path of the transceiver in response to a signal transmitted in the transmit path thereof; such echo signal consisting of a substantially undelayed near echo signal and a delayed distant echo signal; such echo cancelling circuit comprising a near echo canceller receiving the signal from the transmit path without delay and a distant echo canceller receiving such transmit path signal with a delay substantially equal to the measured delay of the distant echo signal; said method comprising the steps of:

transmitting, by modulation of a carrier wave, successive data sequences having a periodic autocorrelation function with sidelobes of negative or zero value and having a duration at least equal to the maximum value of the delay to be measured, the number of elements of each data sequence determining the accuracy of measurement of the distant echo delay;

after transmitting each data sequence, calculating the correlation function between the data of the next transmitted sequence and the data recovered by demodulating the received echo signal produced by the preceding data sequence and storing successive samples representative of said correlation function in a memory;

processing the stored correlation function samples to eliminate samples corresponding to the near echo signal and to determine from among the remaining samples the sample corresponding to the maximum value of said correlation function; and calculating the delay of the distant echo signal from the rank order of such maximum sample among such remaining samples.

2. The method as claimed in claim 1, in which each of said transmitted data sequence used to modulate a carrier in the transmit path is a maximum-length pseudo-random sequence of elements having a value $+1$ or $-1$.

3. A method as claimed in claim 1, in which each of said transmitted data sequences is formed of complex data elements such that its periodic autocorrelation function has sidelobes of zero value.

4. A method as claimed in claim 1, wherein said transceiver transmits data by modulation of a carrier wave at a modulation rate H, such method being further characterized in that the duration of each data element in each transmitted data sequence is equal to m/H, m being an integer, and the transmission of each data sequence is performed by modulating the carrier wave at the modulation rate H and repeating m times the same data value of each data element in such sequence.

5. The method as claimed in claim 4, in which the frequency of the carrier wave used for transmission of each data sequence is equal to the modulation rate H.

6. In a transceiver comprising an echo cancelling circuit for cancelling an echo signal produced in the receive path of the transceiver in response to a signal transmitted in the receive path thereof, such echo signal consisting of a substantially undelayed near echo signal and a delayed distant echo signal, such echo cancelling circuit comprising a near echo canceller receiving the signal in the transmit path without delay and a distant echo canceller receiving such transmit path signal with a delay substantially equal to the measured delay of the distant echo signal; an apparatus for measuring the delay of the distant echo signal produced in the receive path of said transceiver, such apparatus comprising:

means for transmitting in the transmit path of said transceiver, by modulation of a carrier wave at a modulation rate H, successive data sequences having a periodic autocorrelation function with sidelobes of negative or zero value, the duration of each such sequence being at least equal to the maximum value of the delay to be measured;

means for demodulating the echo signal produced in the receive path of said transceiver in response to a transmitted data sequence so as to derive in-phase and quadrature-phase baseband components of such received echo signal;

means for sampling said in-phase and quadrature-phase components of the received echo signal at a frequency $2H/m$, m being an integer;

means for deriving successive samples of the modulus of the periodic correlation function between the data of a succeeding transmitted data sequence and the complex signal formed by said in-phase and quadrature-phase components of the echo signal received in response to the preceding transmitted data sequence;

and a memory for storing said successive samples of the modulus of said correlation function.

7. An apparatus as claimed in claim 6, wherein said means for transmitting successive data sequences in the transmit path of said transceiver transmits more than two such data sequences, and such apparatus further comprises means for integrating corresponding samples of the modulus of said correlation function derived from the successive transmitted data sequences, said integrated samples constituting the modulus samples stored in said memory.

8. An apparatus as claimed in claim 6, wherein the frequency of the carrier wave for transmission of said data sequences is equal to the modulation rate H, and said means for demodulating the received echo signal comprises two sampling circuits for sampling the received echo signal with two sampling signals having a frequency H and a mutual phase shift of 90°.

9. An apparatus as claimed in claim 6, wherein the periodic auto-correlation function of the transmitted data sequences has sidelobes of zero value, and said apparatus further comprises: means for reading from said memory the correlation function modulus samples derived in a predetermined time interval free from near echo signals; means for comparing the values of such read-out samples with a threshold value; and means for determining the rank order among such samples of any sample exceeding such threshold value.

10. An apparatus as claimed in claim 6, wherein the periodic auto-correlation function of the transmitted data sequences has sidelobes of negative value; and said apparatus further comprises: means for reading from said memory the correlation function modulus samples derived in a predetermined time interval free from near echo signals; means for forming the mean value of those of such read-out samples derived in a predetermined time interval free from distant echo signals;

means for forming samples of the differences between said mean value and those of such read-out samples derived in a predetermined time interval in which only a distant echo signal can occur; means for comparing the absolute value of each of said difference samples with a threshold value; and means for determining the rank among such difference samples of the difference sample having the largest absolute value exceeding said threshold value.

11. An apparatus as claimed in claim 10, in which said threshold value is proportional to said mean value.

* * * * *